US010027067B2

(12) United States Patent
Peters et al.

(10) Patent No.: US 10,027,067 B2
(45) Date of Patent: Jul. 17, 2018

(54) HAZARDOUS AREA COUPLER DEVICE FOR HIGH FREQUENCY SIGNALS

(71) Applicant: Solexy USA, LLC, Cincinnati, OH (US)

(72) Inventors: Mark E Peters, Hamilton, OH (US); Tim E Malinak, Cincinnati, OH (US)

(73) Assignee: Solexy USA, LLC, Cincinnati, OH (US)

( * ) Notice: Subject to any disclaimer, the term of this patent is extended or adjusted under 35 U.S.C. 154(b) by 565 days.

(21) Appl. No.: 14/337,934

(22) Filed: Jul. 22, 2014

(65) Prior Publication Data

US 2015/0029625 A1 Jan. 29, 2015

Related U.S. Application Data

(60) Provisional application No. 61/858,814, filed on Jul. 26, 2013.

(51) Int. Cl.

| | |
|---|---|
| ***H01C 7/12*** | (2006.01) |
| ***H02H 1/00*** | (2006.01) |
| ***H02H 1/04*** | (2006.01) |
| ***H02H 3/22*** | (2006.01) |
| ***H02H 9/06*** | (2006.01) |
| ***H01R 13/66*** | (2006.01) |
| *H01R 13/68* | (2011.01) |
| *H01R 13/74* | (2006.01) |

(52) U.S. Cl.
CPC ..... *H01R 13/6666* (2013.01); *H01R 13/6658* (2013.01); *H01R 13/68* (2013.01); *H01R 13/746* (2013.01); *H01R 2201/04* (2013.01)

(58) Field of Classification Search
CPC ............................... H02H 9/04; H02H 1/0007
USPC ............................................................ 361/119
See application file for complete search history.

(56) References Cited

U.S. PATENT DOCUMENTS

| | | | | |
|---|---|---|---|---|
| 4,864,077 | A | 12/1989 | Wadell | |
| 5,574,610 | A * | 11/1996 | Tachick | C23F 13/04 361/111 |
| 5,850,095 | A | 12/1998 | Chen | |
| 6,072,683 | A * | 6/2000 | Masghati | H04M 3/18 361/119 |
| 7,057,577 | B1 * | 6/2006 | Willoughby | H01Q 1/50 343/872 |
| 7,259,952 | B2 * | 8/2007 | Flasza | H01Q 1/002 361/113 |
| 7,507,105 | B1 * | 3/2009 | Peters | H01R 13/53 439/374 |
| 8,304,807 | B2 | 11/2012 | Maloney | |
| 2006/0181833 | A1 * | 8/2006 | Brown | H02H 9/042 361/124 |
| 2008/0285186 | A1 * | 11/2008 | Kothari | H02H 9/008 361/56 |
| 2010/0256481 | A1 | 10/2010 | Mareci | |

* cited by examiner

*Primary Examiner* — Thienvu Tran
*Assistant Examiner* — Lucy Thomas
(74) *Attorney, Agent, or Firm* — Duncan Galloway Egan Greenwald PLLC; Theresa Camoriano; Kevin Duncan

(57) ABSTRACT

A hazardous area coupler is provided which uses arrays of diodes to permit low voltage alternating current signals to pass through while shunting to ground any voltages greater than the clamping voltage of the diodes.

19 Claims, 7 Drawing Sheets

HAZARDOUS AREA COUPLER DEVICE FOR HIGH FREQUENCY SIGNALS

This application claims priority from U.S. Provisional Application Ser. No. 61/858,814, filed Jul. 26, 2013, which is hereby incorporated herein by reference.

BACKGROUND

The present invention relates to couplers for use in transmitting intrinsically safe high frequency signals into hazardous areas, such as for use through the wall of a hazardous area enclosure.

In the prior art, the couplers that have been used for transmitting intrinsically safe signals into hazardous areas have used a Zener diode array, which is suitable for transmitting DC signals, but which has a high capacitance, on the order of nanofarads, which results in the circuit shunting alternating current signals to ground. This prevents those couplers from being able to be used to transmit intrinsically safe alternating current signals, and in particular high frequency signals such as Ethernet signals.

SUMMARY

The present invention has circuitry that uses a different diode arrangement, which has a much lower capacitance, on the order of picofarads (one thousand times less than the prior art Zener diode arrangements). This arrangement permits alternating current signals, including high frequency signals such as Ethernet signals, to pass through while shunting to ground any signal greater than the clamping voltage of the diodes. Thus, it allows for the transmission of intrinsically safe high frequency signals.

DESCRIPTION

Figure 1:
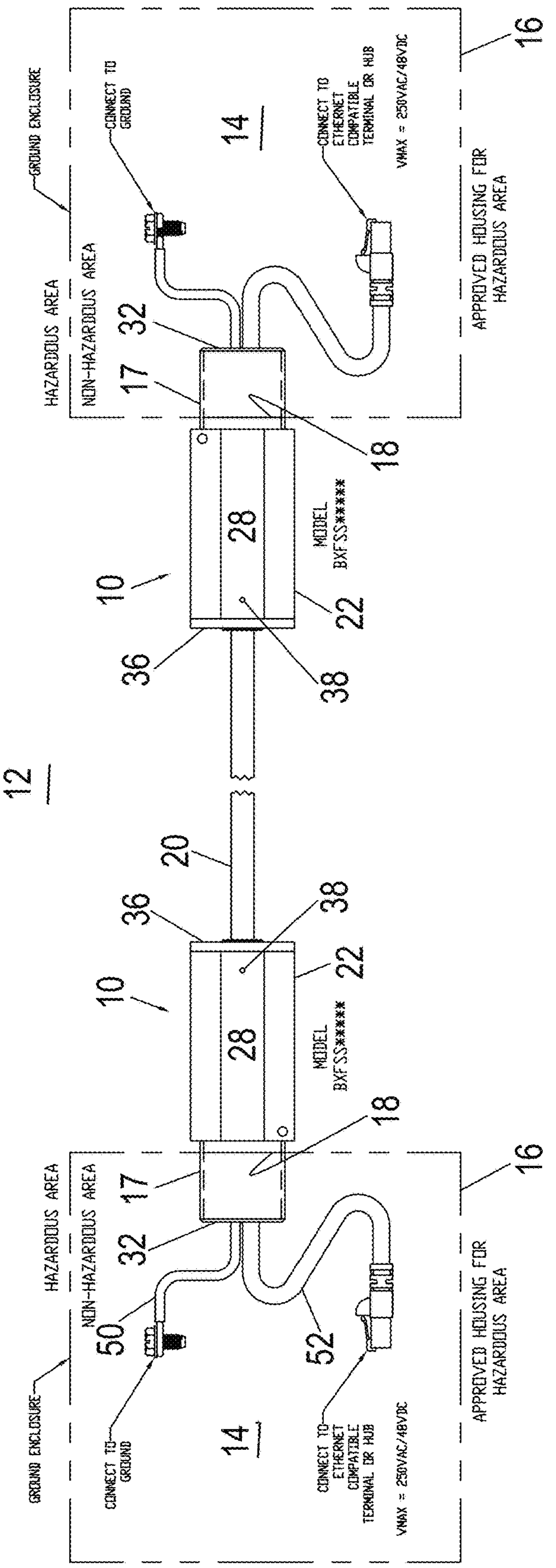
FIG. 1 is a schematic diagram showing two hazardous area coupler devices being used to connect through a hazardous area to two non-hazardous areas.

FIG. 1 shows an arrangement in which two hazardous area couplers 10 are being used to connect through a hazardous area 12 into two non-hazardous areas 14. There is a housing or enclosure 16 enclosing each non-hazardous area 14. Each of the couplers 10 has a threaded end 17, which is threaded into a threaded opening 18 in the wall of each of the housings 16, and a cable 20 extends between the two hazardous area couplers 10, with one end of the cable 20 being plugged into the coupler 10 on the left and the other end of the cable 20 being plugged into the coupler 10 on the right.

In this particular embodiment, the cable is a CATS/5e industrial Ethernet cable for use in transmitting Ethernet signals, on the order of 10 MHz to 1 GHz and 1-3V. It is understood that the cable will be whatever is suitable for the type of signal being transmitted. It is contemplated that a similar arrangement may be used for transmitting signals of 1 MHz to 1 GHz and up to 30V, with the cables being selected to be suitable for carrying the signals.

Each of the hazardous area couplers 10 provides a preformed product that incorporates the electrical isolation and physical protection required for a hazardous area coupler. The TVS (Transient Voltage Suppression) diode arrays in the electrical circuitry in each coupler 10 ensure that the maximum voltage of the circuit output will not exceed the clamping voltage of the diodes, which is greater than the voltage levels of the high frequency signal.

In this particular embodiment, the clamping voltage of the diodes is 3.7 volts. A typical Ethernet signal is 1.5 to 2.5 volts, so this array will permit the Ethernet signal to pass through. Obviously, if higher voltage signals are intended to be allowed to pass through, diodes with a higher clamping voltage would be selected. Current limiting resistors control the current through the circuit, limiting the current to the output of the circuit and to the diodes. A quick blow fuse is provided in case of an excess of current. The electrical circuitry is on a circuit board assembly which is installed inside a one-piece hollow fitting and then is encapsulated in a potting material, which seals the electronics from the atmosphere, makes the entire unit tamperproof, prevents the escape of flammable gases, and protects against certain defined chemicals and solvents as well as providing the strength to pass the required 6000 psi hydrostatic test.

As shown in FIGS. 1-3A, the coupler 10 is housed in a one-piece hollow housing 22, which has a generally hollow cylindrical shape, with an externally threaded left end 17 that threads through a threaded opening 18 in the wall of the housing or enclosure 16. There is a shoulder 26 on the outer surface of the housing 22, which abuts the outer surface of the wall of the hazardous area enclosure 16 when the housing 22 is fully threaded into the wall. There is also a shoulder 26A on the inner surface of the housing 22, which helps ensure that the potting material 30 does not push out of the open left end 32 of the housing 22. There are also internal circular grooves 26B on the inner surface of the housing 22 which help ensure that the potting material 30 does not push out the open end 32.

The outer surface of the housing 22 has opposed flat surfaces 28, which permit a user to grasp the housing 22 with an open-end wrench, in order to thread the housing 22 into the wall of the hazardous area enclosure 16.

The open right end 34 of the housing 22 is enclosed by an end cap 36, which is mechanically secured to the housing 22 by means of a dowel pin 38, which extends through a hole 40 in the housing 22 and into a circumferential groove 42 in the end cap 36 to ensure that the end cap 36 remains on the housing 22.

A receptacle 44 is threaded through the end cap 36 and is sealed against the inner end of the end cap 36 by means of an O-ring 46. In this particular embodiment, which is intended for use with Ethernet signals, an M12 receptacle is used. The M12 receptacle 44 will mate with a M12 male connector at the end of the CAT5 cable 20 at its outer end, and its inner end is connected to the circuit board 48.

At the other end of the circuit board 48 are connected a grounding pigtail cable 50 and a signal cable 52, both of which project out the end 32 of the housing 22 into the non-hazardous area, where the grounding pigtail cable 50 is grounded to a protective earth ground, and the signal cable 52, which in this embodiment is a Cat5 cable, has a suitable male connector (in this particular embodiment RJ-45 style) that can then be connected to a device with the signal bus protocol inside the non-hazardous area 14.

Figure 2:
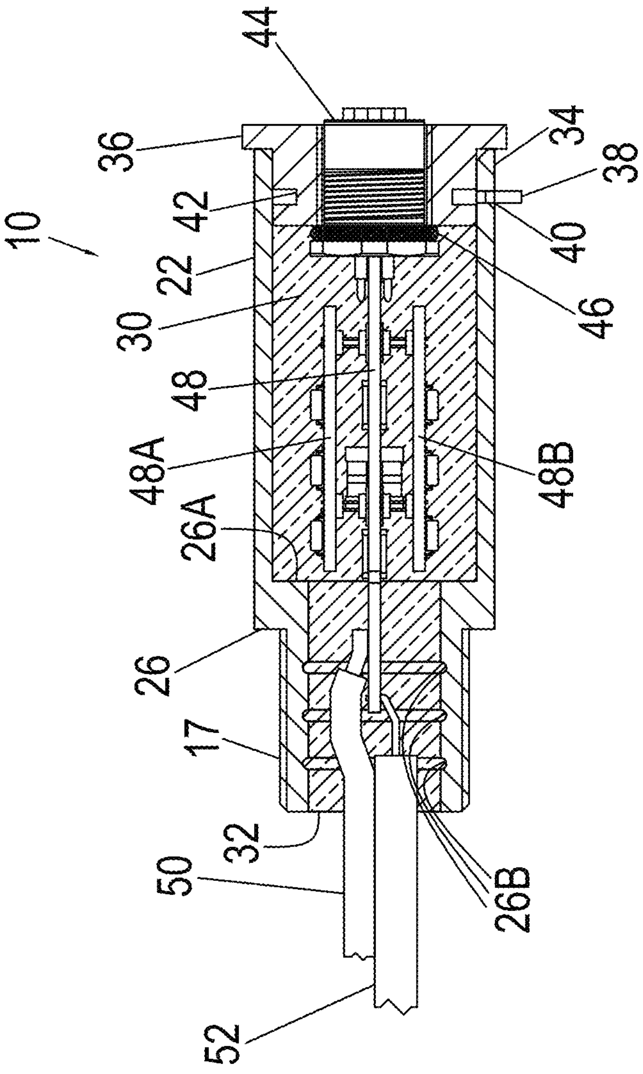
FIG. 2 is a section view through the coupler on the left side of FIG. 1.
Figure 3:
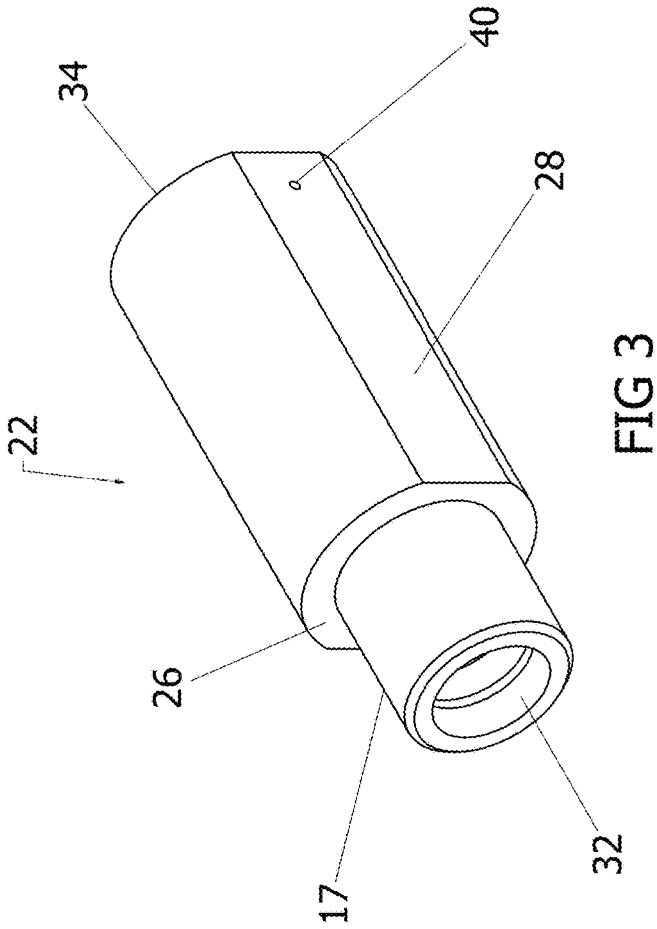
FIG. 3 is a perspective view of the housing of the coupler on the left side of FIG. 1.
Figure 3A:
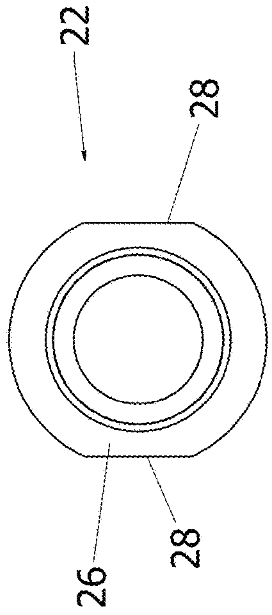
FIG. 3A is an end view of the housing of FIG. 3.

As can be seen in FIG. 2, there are three circuit boards 48, 48A, 48B inside the housing 22. The upper and lower boards 48A, 48B include the TVS (Transient Voltage Suppression) diode arrays D1-D12, and the main circuit board 48 includes the resistors and fuses, as will be described below.

Figure 4:
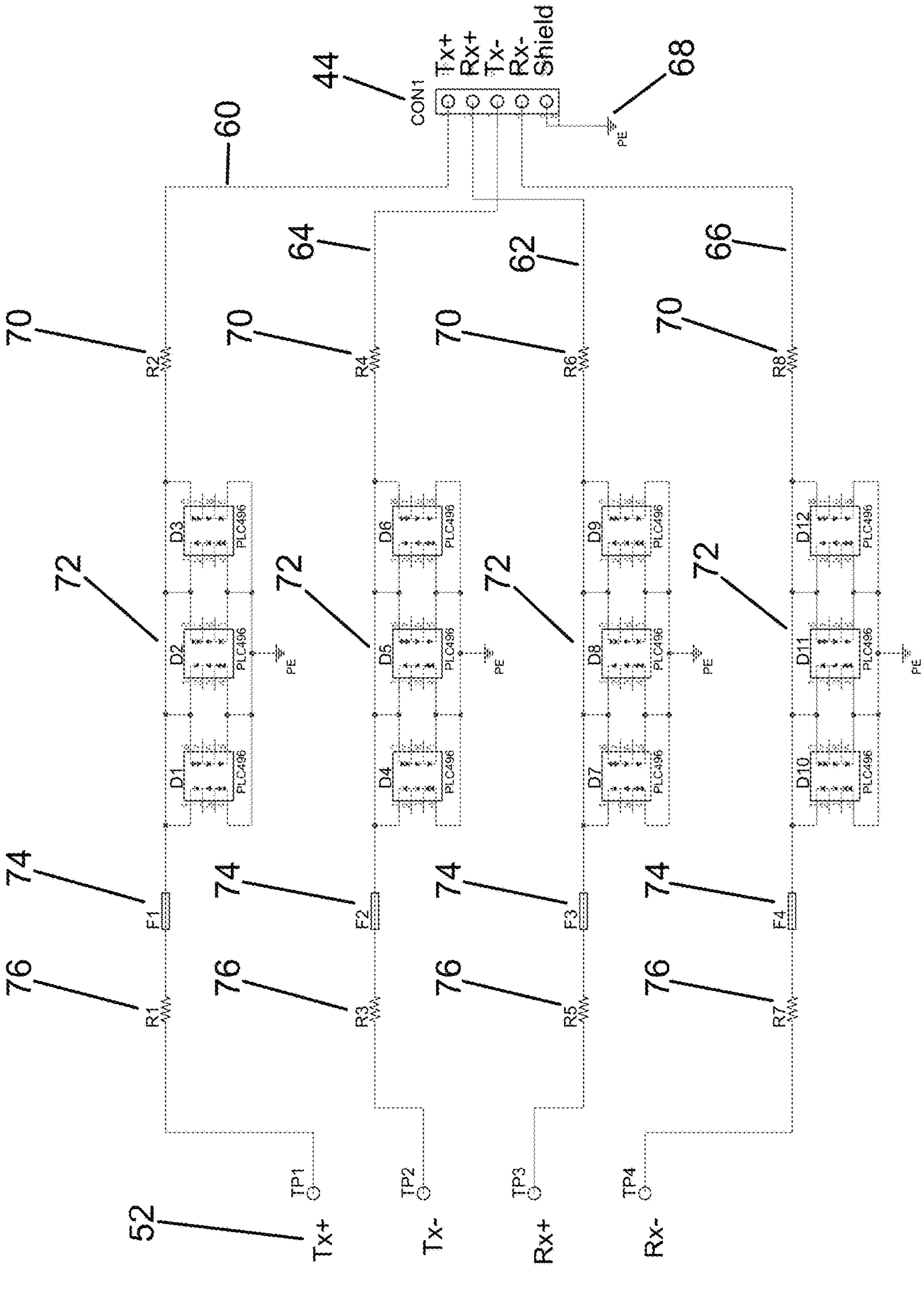
FIG. 4 is an electrical schematic of the coupler on the left side of FIG. 1.

FIG. 4 is a schematic of the circuitry of the three boards 48, 48A, 48B together. On the right end is the receptacle 44, which has connections to the Tx+ and Tx− transmission lines 60, 64, to the Rx+ and Rx− receiving lines 62, 66, and to a protective earth ground 68.

From the receptacle 44, each of the lines 60, 62, 64, 66 goes to a suitable resistor 70 (in this embodiment 20 ohm), to an array of diodes 72, to a fuse 74, to another resistor 76 (in this embodiment 10 ohm), to the respective connecting pins of the RJ-45 style connector at the end of the pigtail 52.

Each of the arrays of diodes 72 includes three TVS diode arrays connected together in parallel. Each TVS diode array (D1-D12) in this particular embodiment has a capacitance of 1.2 picofarads, so each array 72 of three TVS diode arrays connected in parallel has a capacitance of 3.6 picofarads. Each of the TVS diode arrays includes eight diodes, so there are twenty-four diodes in each of the diode arrays 72. Each of the arrays 72 is grounded, as shown in the schematic of FIG. 4, so the arrangement permits signals up to the clamping voltage of the diodes (in this embodiment 3.7 volts) to pass through but shunts anything above the clamping voltage to ground. This provides the required isolation while still permitting the high frequency (in this case Ethernet signals of 10 MHz to 1 GHz) to pass through, whereas the Zener diodes used in prior art hazardous area couplers blocked the high frequency signals due to the high capacitance of the Zener diodes.

It should be noted that the TVS (Transient Voltage Suppression) diode arrays have not been used for this purpose in the past. Instead, their purpose has been to protect an electronic device from being damaged by fast spikes of voltage transients on the order of several micro-seconds, such as a static electric discharge.

In this particular embodiment, the housing 22 is made of stainless steel.

Figure 4A:
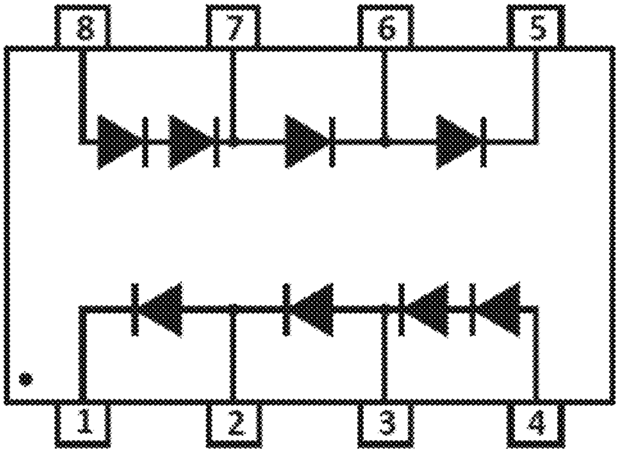
FIG. 4A shows the pin arrangement of each of the TVS diode arrays in the circuitry of FIG. 4.

The TVS diode arrays (D1-D12) that are used in this particular embodiment are part number PLC496, a 500 Watt, ultra low capacitance TVS array supplied by ProTek Devices in Tempe, Ariz., US. The pin arrangement of each of these arrays is shown in FIG. 4A.

A coupler 10 is used at each end where a separate supply voltage is connected to the signal source device in order to have proper protection. The high frequency signal has transmit Tx and receive Rx lines, each of which is protected by the circuitry.

In assembling the couplers 10, the receptacle 44 is threaded into the end cap 36, the circuit boards 48, 48A, 48B, with connectors and wires 50, 52 are inserted into the hollow interior of the housing 22 through the open right end 34, and then the end cap 36 is pinned to the housing 22 by means of the dowel pin 38. Next, the potting material 30 is injected from the open left end 32 and is allowed to cure. At that point, the couplers 10 are complete.

Figure 5:
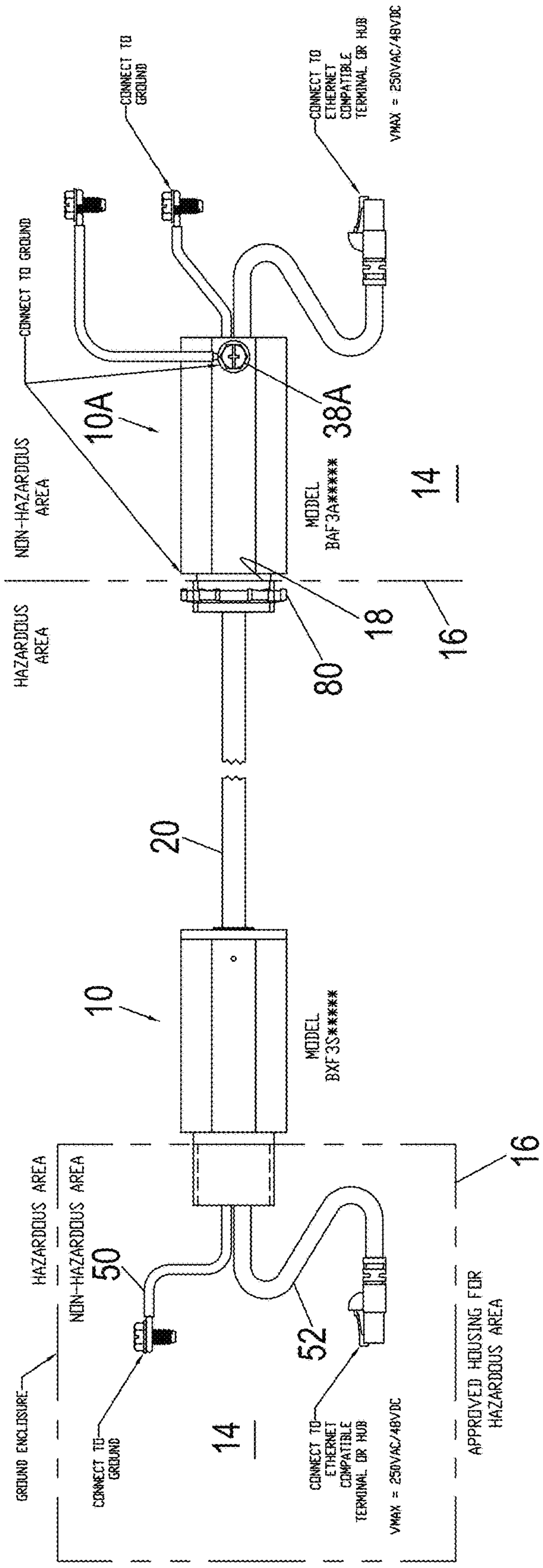
FIG. 5 is the same view as FIG. 1, but with an alternative coupler device on the right side.

FIG. 5 shows an alternative arrangement, in which the coupler 10A on the right is different from the coupler 10 on the left.

Figure 6:
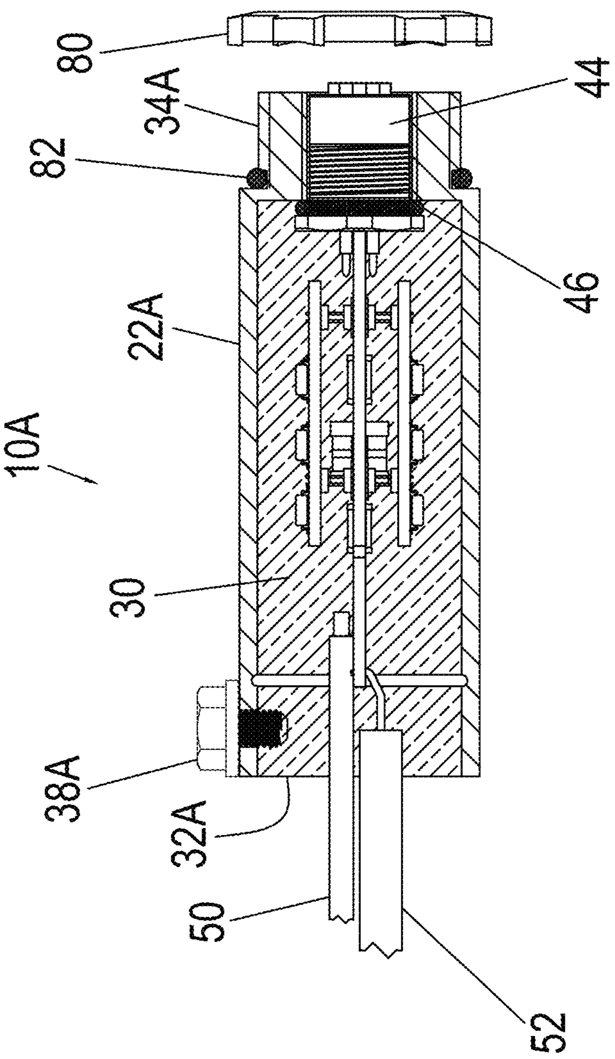
FIG. 6 is a section view through the coupler on the right side of FIG. 5.

FIG. 6 shows the coupler 10A in more detail. This coupler 10A has the same electronic circuitry as the previous coupler 10, but its physical structure is a little different. It uses a screw 38A to ground the housing 22A and help ensure that the potting material 30 stays in place. This housing 22A has internal and external shoulders and external threads at its right end 34A, and this threaded end 34A extends through the opening 18 from the non-hazardous side of the housing wall 16 and is secured by a threaded nut 80. An O-ring 82 provides a seal.

In this case, the coupler 10A is manufactured by inserting the circuit boards from the open left end 32A, screwing in the grounding screw 38A, and then injecting the potting material 30 and allowing it to cure.

In this particular embodiment, the housing 22A is made of coated aluminum.

Other structural changes could be made to the couplers, and various combinations of couplers could be used as needed.

It will be obvious to those skilled in the art that modifications may be made to the embodiments described above without departing from the scope of the invention as claimed.

What is claimed is:

1. A coupler for allowing electronic transmission of an alternating current signal through the wall of a hazardous area enclosure, comprising:

a hollow coupler housing body having an elongated shape defining a first end and a second end;

an electronic circuit disposed inside said hollow coupler housing body wherein there is a space between the electronic circuit and the hollow coupler housing body;

potting material encapsulating the electronic circuit and filling the space;

a first set of signal lines disposed at least in part inside the hollow coupler housing body and having an inner termination at the electronic circuit and an outer termination projecting out of said first end; a second set of signal lines having an inner termination at the electronic circuit and an outer termination projecting out of said second end; each of the signal lines in said first set of signal lines corresponding to one of the signal lines in said second set of signal lines;

wherein said electronic circuit includes current limiting resistors; fuses, which provide for over-current protection in case of a fault; respective electrical paths between the inner terminations to connect each signal line of said first set of signal lines with a corresponding signal line of said second set of signal lines; and a plurality of low capacitance diode array sets, each of said low capacitance diode array sets comprising a plurality of low capacitance diodes, with each of said low capacitance diode array sets electrically disposed between a respective electrical path and protective ground and wherein each of said low capacitance diode array sets collectively has a capacitance not greater than four picofarads and has a clamping voltage, such that the electronic circuit permits alternating current signals to pass between the first and second-sets of signal lines but shunts to ground any signal greater than the clamping voltage of the respective low capacitance diode array set, whereby the coupler allows for the transmission of intrinsically safe high frequency signals and provides protection from supply voltage connected to signal source devices associated with the high frequency signals.

2. A coupler for allowing electronic transmission of an alternating current signal through the wall of a hazardous area enclosure as recited in claim 1, wherein said electronic circuit permits alternating current signals between 10 MHz and 1 GHz to pass through between the first and second sets of signal lines.

3. A coupler for allowing electronic transmission of an alternating current signal through the wall of a hazardous area enclosure as recited in claim 2, wherein the clamping voltage of each of the diode array sets is greater than three volts.

4. A coupler for allowing electronic transmission of an alternating current signal through the wall of a hazardous area enclosure as recited in claim 1, and further comprising a ground cable having a first end electrically connected to the electronic circuit including the plurality of low capacitance diode array sets and a second end extending from the coupler housing and electrically connected to a protective earth ground element.

5. A coupler for allowing electronic transmission of an alternating current signal through the wall of a hazardous area enclosure as recited in claim 1, wherein at least one of the first and second sets of signal lines comprises a signal cable adapted to transmit alternating current signals via the electronic circuit.

6. A coupler for allowing electronic transmission of an alternating current signal through the wall of a hazardous area enclosure as recited in claim 1, wherein the hollow coupler housing body defines a shoulder and the potting material abuts the shoulder to resist becoming dislocated from the hollow coupler housing body.

7. A coupler for allowing electronic transmission of an alternating current signal through the wall of a hazardous area enclosure as recited in claim 1, wherein the hollow coupler housing body and the potting material provide a seal off of the electronic circuitry capable of withstanding a 6,000 Pounds per Square Inch (PSI) hydrostatic test.

8. A coupler for allowing electronic transmission of an alternating current signal through the wall of a hazardous area enclosure as recited in claim 1, wherein each of said low capacitance diode array sets comprises three low capacitance diode arrays, each of the three low capacitance diode arrays having a capacitance of less than two picofarads and each of said low capacitance diode array sets collectively has a capacitance not greater than four picofarads.

9. A coupler for allowing electronic transmission of an alternating current signal through the wall of a hazardous area enclosure as recited in claim 1, wherein each of the low capacitance diode array sets comprises low capacitance Transient Voltage Suppression (TVS) diode arrays.

10. A coupler for allowing electronic transmission of an alternating current signal through the wall of a hazardous area enclosure as recited in claim 1, wherein the electronic circuit disposed inside said hollow coupler housing body comprises a first circuit board comprising a first plurality of low capacitance diode arrays and a second circuit board comprising a second plurality of low capacitance diode arrays, wherein the first and second circuit boards are spaced apart from each other in the space and are spaced apart from the coupler housing body and wherein the potting material fills the space between the first and second circuit boards and between the first and second circuit boards and the coupler housing body, and wherein the plurality of low capacitance diode array sets comprise the first and second plurality of low capacitance diode arrays.

11. A coupler for allowing electronic transmission of an alternating current signal through the wall of a hazardous area enclosure as recited in claim 10, wherein said electronic circuit permits alternating current signals between 10 MHz and 1 GHz to pass through between the first and second sets of signal lines.

12. A coupler for allowing electronic transmission of an alternating current signal through the wall of a hazardous area enclosure as recited in claim 11, wherein the clamping voltage of each of the diode array sets is greater than three volts.

13. A coupler for allowing electronic transmission of an alternating current signal through the wall of a hazardous area enclosure as recited in claim 10, and further comprising a ground cable having a first end electrically connected to the electronic circuit including the plurality of low capacitance diode array sets and a second end extending from the coupler housing and electrically connected to a protective earth ground element.

14. A coupler for allowing electronic transmission of an alternating current signal through the wall of a hazardous area enclosure as recited in claim 10, wherein at least one of the first and second sets of signal lines comprises a signal cable adapted to transmit alternating current signals via the electronic circuit.

15. A coupler for allowing electronic transmission of an alternating current signal through the wall of a hazardous area enclosure as recited in claim 10, wherein the hollow coupler housing body defines a shoulder and the potting material abuts the shoulder to resist becoming dislocated from the hollow coupler housing body.

16. A coupler for allowing electronic transmission of an alternating current signal through the wall of a hazardous area enclosure as recited in claim 10, wherein the hollow coupler housing body and the potting material provide a seal off of the electronic circuitry capable of withstanding a 6,000 Pounds per Square Inch (PSI) hydrostatic test.

17. A coupler for allowing electronic transmission of an alternating current signal through the wall of a hazardous area enclosure as recited in claim 10, wherein each of said low capacitance diode array sets comprises three low capacitance diode arrays, each of the three low capacitance diode arrays having a capacitance of less than two picofarads and each of said low capacitance diode array sets collectively has a capacitance not greater than four picofarads.

18. A coupler for allowing electronic transmission of an alternating current signal through the wall of a hazardous area enclosure as recited in claim 10, wherein each of the low capacitance diode array sets comprises low capacitance Transient Voltage Suppression (TVS) diode arrays.

19. A coupler for allowing electronic transmission of an alternating current signal through the wall of a hazardous area enclosure as recited in claim 1, wherein the supply voltage connected to signal source devices associated with the high frequency signals has a maximum voltage of 250 VAC/48 VDC.

* * * * *